(12) United States Patent
Yu et al.

(10) Patent No.: US 10,950,886 B2
(45) Date of Patent: Mar. 16, 2021

(54) LARGE ENERGY DENSITY BATTERIES AND METHODS OF MANUFACTURE

(71) Applicant: The Texas A&M University System, College Station, TX (US)

(72) Inventors: Choongho Yu, College Station, TX (US); Gang Yang, College Station, TX (US)

(73) Assignee: The Texas A&M University System, College Station, TX (US)

( * ) Notice: Subject to any disclaimer, the term of this patent is extended or adjusted under 35 U.S.C. 154(b) by 294 days.

(21) Appl. No.: 16/063,950

(22) PCT Filed: Jan. 5, 2017

(86) PCT No.: PCT/US2017/012405
§ 371 (c)(1),
(2) Date: Jun. 19, 2018

(87) PCT Pub. No.: WO2017/120391
PCT Pub. Date: Jul. 13, 2017

(65) Prior Publication Data
US 2020/0274186 A1    Aug. 27, 2020

Related U.S. Application Data

(60) Provisional application No. 62/276,672, filed on Jan. 8, 2016.

(51) Int. Cl.
*H01M 10/052* (2010.01)
*H01M 4/38* (2006.01)
*H01M 4/80* (2006.01)
*H01M 4/66* (2006.01)
*H01M 10/0585* (2010.01)
*H01M 4/02* (2006.01)

(52) U.S. Cl.
CPC ........... *H01M 10/052* (2013.01); *H01M 4/38* (2013.01); *H01M 4/663* (2013.01); *H01M 4/80* (2013.01); *H01M 10/0585* (2013.01); *H01M 2004/021* (2013.01)

(58) Field of Classification Search
CPC ........ H01M 10/052; H01M 4/38; H01M 4/80; H01M 4/66
See application file for complete search history.

(56) References Cited

U.S. PATENT DOCUMENTS

| | | |
|---|---|---|
| 6,358,643 B1 | 3/2002 | Katz et al. |
| 8,974,946 B2 | 3/2015 | Cai et al. |
| 2009/0121182 A1 | 5/2009 | Ajayan et al. |

(Continued)

*Primary Examiner* — Kenneth J Douyette
(74) *Attorney, Agent, or Firm* — Winstead PC

(57) ABSTRACT

Embodiments of the claimed invention are directed to a device, comprising: an anode that includes a lithiated silicon-based or lithiated carbon-based material or pure lithium metal or metal oxides and a sandwich-type sulfur-based cathode, wherein the anode and the cathode are designed to have porous structures. An additional embodiment of the invention is directed to a scalable method of manufacturing sandwich-type Li—S batteries at a significantly reduced cost compared to traditional methods. An additional embodiment is directed to the use of exfolidated CNT sponges for enlarging the percentage of sulfur in the cathode to have large energy density.

5 Claims, 7 Drawing Sheets

(56) References Cited

U.S. PATENT DOCUMENTS

| | | | |
|---|---|---|---|
| 2013/0224594 A1* | 8/2013 | Yushin | H01M 4/366 429/218.1 |
| 2014/0050973 A1 | 2/2014 | Manthiram et al. | |
| 2014/0193723 A1 | 7/2014 | Kumaresan et al. | |
| 2015/0010788 A1* | 1/2015 | Aria | H01M 10/0525 429/50 |
| 2015/0188109 A1 | 7/2015 | Kim et al. | |

* cited by examiner

LARGE ENERGY DENSITY BATTERIES AND METHODS OF MANUFACTURE

CROSS-REFERENCE TO RELATED APPLICATIONS

This application claims priority to and incorporates by reference the entire disclosure of U.S. Provisional Patent Application No. 62/276,672, which was filed on Jan. 8, 2016.

STATEMENT REGARDING FEDERALLY SPONSORED RESEARCH AND DEVELOPMENT

This invention was made with government support under Grant No. CMMI 1030958 awarded by the National Science Foundation. The government has certain rights in the invention.

BACKGROUND OF THE INVENTION

The most widely used Li-ion batteries are $LiCoO_2$ based cells, which possess good energy density and life cycles. However, cobalt based cathodes are too expensive to be used for large-scale systems such as electric vehicles and renewable energy harvesting systems. Higher energy density, better reliability, and improved safety are also necessary for widespread use of Li-ion batteries. For instance, a single charge of an electric vehicle is unable to sustain current standard driving distance per charge (~500 km). Lithium-sulfur (Li—S) batteries have been investigated as a possible solution due to high energy density and inexpensive raw materials.

Sulfur undergoes the following overall redox reaction: $S_8 + 16\, Li^+ + 16\, e^- \leftrightarrow 8\, Li_2S$. This reaction yields theoretical capacities of 1672 mAh/g with an average redox potential of ~2.2 V (vs. $Li/Li^+$). With a theoretical capacity of 3860 mAh/g for the Li metal anode, the theoretical energy density of Li—S batteries can be as high as 2567 Wh/kg. The performance of Li—S batteries is outstanding, compared to theoretical values of popular $LiCoO_2$-graphite based batteries (584 Wh/kg and 376 Wh/kg when $LiCoO_2$ capacity is considered as 274 mAh/g and 140 mAh/g, respectively). Considering that sulfur may be obtained at prices of as little as ~1/300 of that of cobalt, Li—S batteries are strong candidates to become next generation energy storage devices provided that current major drawbacks are eliminated or alleviated.

In practice, actual capacity of Li—S batteries is reduced compared to theoretical capacities. Significant reduction in actual capacity is partly caused by electrically insulating sulfur due to poor charge transfer. This reduction in capacity can be alleviated by adding electrically conducting carbon structures to sulfur. On the other hand, the Li metal anode in Li—S batteries is unsafe, unreliable, and expensive. Li—S batteries also have relatively fast capacity fading during cycling due to polysulfide shuttle mechanisms, making the lifetime of Li—S batteries shorter than the demand of current energy storage devices.

During the lithiation of sulfur in a cathode, a series of polysulfides ($Li_2S_x$, x=3~8) are produced as intermediates. They can easily dissolve in organic solvents and thereby diffuse to the lithium metal (anode) side, where they are reduced to solid precipitates such as $Li_2S$ and $Li_2S_2$. The repeated shuttle process during the cycling of the cell considerably reduces the active mass in the cathode, leading to low columbic efficiency and fast capacity fading due to the polysulfide shuttle phenomenon.

To overcome these issues, intensive research has been focused on trapping the solid elemental sulfur inside various carbonaceous nanostructures (e.g. mesoporous carbon, graphene, graphene oxides, and carbon nanotubes) by impregnating the molten sulfur into inner pores. The polysulfide shuttle was slowed since the pore reserved a portion of dissolved polysulfides. Nevertheless, the large quantity of inactive carbonaceous materials significantly reduces the weight percentage of sulfur in the electrode film (typically 30~50 wt. % considering the polymer binder and conductive additive) and thus the energy density of the battery cell.

In place of starting with solid sulfur, an approach is to use polysulfide-containing liquid catholyte as an active material. Compared to the sluggish reaction of insulating solid phases, liquid catholyte can alleviate the aggregation of irreversible S or $Li_2S$, and achieve a higher utilization of active materials. Several recent studies have tried to add the polysulfide-containing electrolyte into the Li—S battery with either a sulfur-containing or a sulfur-free cathode. For the former configuration, polysulfides function as both the shuttle inhibitor and backup active materials. For the latter, the electrode with light-weight carbonaceous materials (e.g. Ketjen black, Super P, and carbon nanotube (CNT) paper) is utilized to provide sites for redox reactions and paths for charge transfer.

Additionally, it has been noted that the Li metal in Li—S batteries causes a safety hazard and short life time due to the formation of lithium dendrite, which may result in an internal short-circuit and thermal runaway. Thermal runaway describes a situation where an increase in temperature cause a further increase in temperature, resulting in positive feedback that can lead to the battery failing. Even after decades of research efforts, this problem has not been resolved sufficiently to see commercially available rechargeable batteries with a Li metal anode.

There is therefore a need for an improved lithium anode that can be used to realize the complete benefits of a lithium battery. It is an objective of the present invention to use lithiated Si instead of Li metal. The high theoretical capacity (~4200 mAh/g) of silicon as anode makes it ideal to couple the high-capacity sulfur cathode.

There is also a need to achieve a long cycling life from Li—S batteries. This has been accomplished in novel semi-liquid Li—S batteries with highly porous CNT sponges as the "super-reservoir" for the liquid polysulfide catholyte or solid sulfur. The Li—S rechargeable battery can be used in multiple applications including, without limitation, in electric vehicle, electronic devices and power tools.

SUMMARY OF THE INVENTION

Embodiments of the claimed invention are directed to a device, comprising: an anode that includes a lithiated carbon nanotube structure, a lithium metal, or a lithiated silicon-based material and a sulfur-based cathode, wherein the anode and the cathode are designed to have mesoporous structures. In certain embodiments, the sulfur-based cathode is a mesoporous carbon structure comprising sulfur within the mesopores.

A further embodiment of the invention is directed to a device comprising a semi-liquid lithium-sulfur battery comprising a lithium anode and a sulfur cathode. In some embodiments, the sulfur cathode comprises a liquid catholyte, which is housed within a reservoir that is a carbon nanotube sponge. In some embodiments, the liquid catholyte is polysulfides dissolved in electrolyte. In some embodiments, the sulfur is present in the form of solid sulfur.

A further embodiment of the invention is directed to a method comprising synthesizing a sulfur cathode wherein synthesizing the sulfur cathode comprises: synthesizing a carbon nanotube sponge; slicing the carbon nanotube sponge into thin pieces; loading sulfur onto one of the thin carbon nanotube sponge pieces; loading another CNT sponge piece on top of the one loaded with sulfur; and/or hot and cold pressing the sandwiched structure, and a lithium metal anode, or a silicon anode wherein the silicon anode is lithiated, or an exfoliated CNT sponge anode loaded with lithium.

A further embodiment of the invention is directed to a method of manufacturing a lithiated silicon-sulfur battery comprising synthesizing carbon based porous materials; preparing thin films of the carbon based materials by slicing, drop casting, and/or vacuum filtration with the exfoliating agent; sandwiching two films with sulfur; hot pressing the sandwiched films into a single stack; assembling the single stack with the desired configuration; making multi-stack cells; assembling the multi-stack cells with a pouch; filling the electrolyte; pre-forming the battery; baking and degassing the battery; forming the battery; sizing and shaping the battery; and sampling and packaging the battery.

DETAILED DESCRIPTION OF EXEMPLARY EMBODIMENTS

The present disclosure is useful for applications involving energy storage devices and their use in a variety of applications. Aspects of the present disclosure have been found to be very useful and advantageous in applications involving various types of batteries, high-energy lithium ion batteries and components of batteries. While the present disclosure is not necessarily limited to such applications, various aspects of the disclosure may be appreciated through a discussion of various examples using this context.

Figure 1:
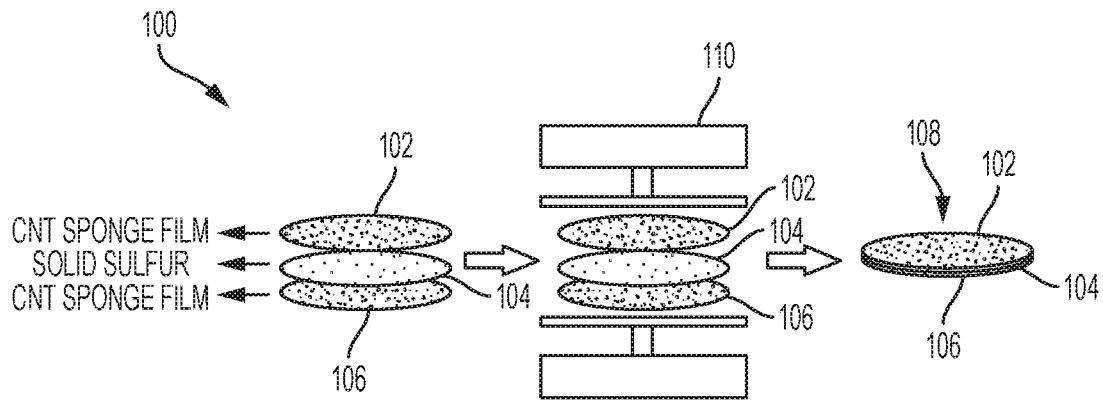
FIG. 1 is a schematic illustrating preparation of sandwich type electrodes.

In some embodiments, porous carbon nanotube sponges or porous multi-dimensional carbon structures are used to sandwich solid sulfur to make a sulfur-containing self-standing electrode. FIG. 1 is a schematic illustrating a process 100 for preparing sandwich type electrodes. In a typical embodiment, a sandwich type electrode 100 includes a CNT sponge 102, a solid sulfer layer 104, and a CNT sponge film 106. The sandwich type electrode 100 features a sandwich design with the solid sulfur layer 104 being sandwiched between two pieces of carbon based films (e.g., the CNT sponge 102 and the CNT sponge film 106). To make a compact self-standing electrode 108, the sandwich type electrode 100 is pressed, for example, in a hydraulic press 110. In other embodiments of the invention, other multidimensional structures such as carbon nanotubes, graphene and graphene flowers can be used in place of the CNT sponges.

Figure 2:
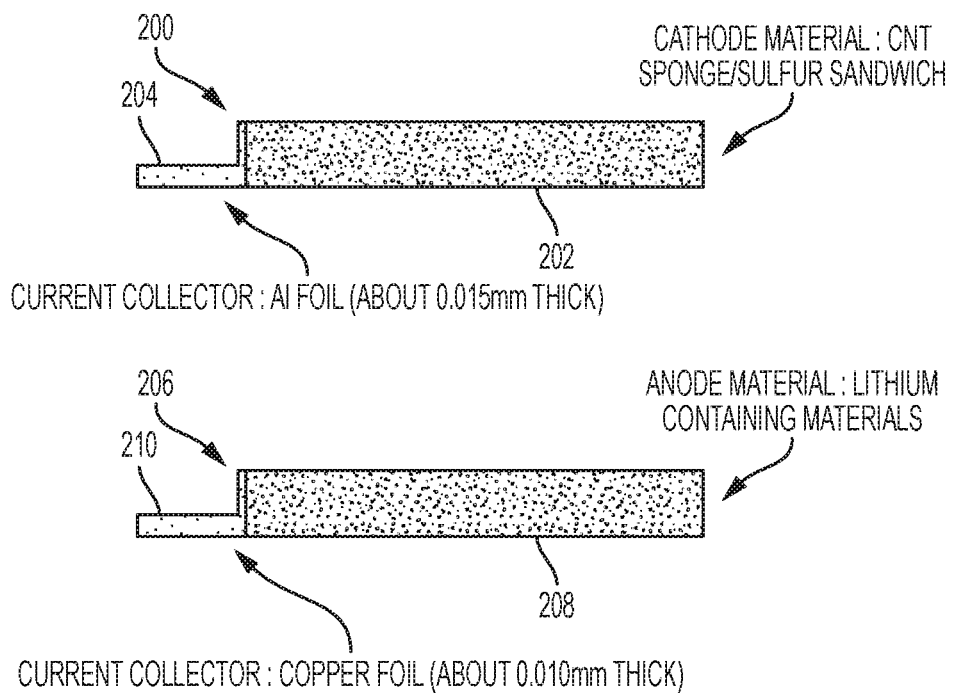
FIG. 2 is a schematic illustrating cathode and anode designs for sandwich type Li—S batteries.

In some embodiments, the sulfur containing sandwich type electrode would be used as a cathode and lithium foil would be used as an anode of the Li—S battery. In a typical embodiment, aluminum foil is used as the current collector for the cathode and copper foil is used as the current collector for the anode. In some embodiments, other materials could be used as the current collector for the anode and the cathode. Illustrative designs of a cathode 200 and an anode 206 are shown in FIG. 2. The cathode 200 comprises a CNT sponge/sulfur sandwich 202 and a current collector 204. In a typical embodiment, the current collector 204 comprises aluminum foil. The anode 206 comprises a lithium foil 208 and a current collector 210. In a typical embodiment, the current collector 210 comprises copper foil.

Figure 3A:
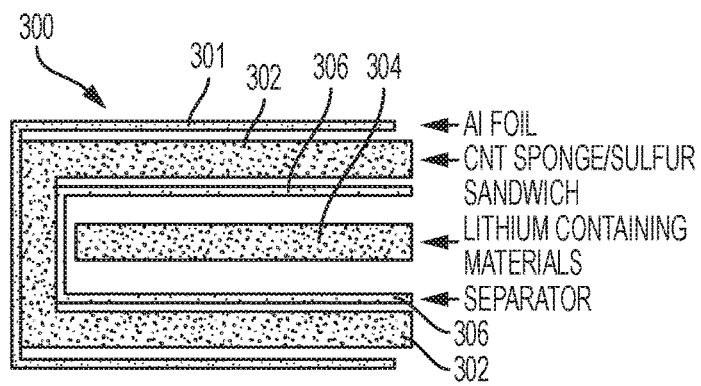
FIGS. 3A and 3B are schematic drawings illustrating a single-stack and a multi-stack of sandwich type Li—S batteries.
Figure 3B:
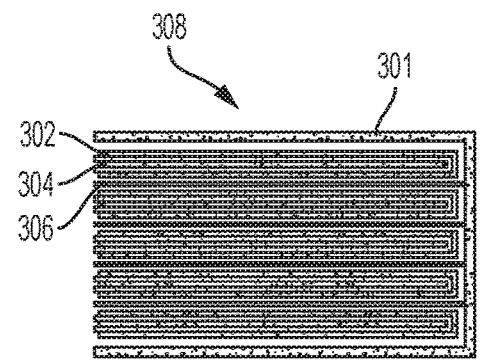

FIGS. 3A and 3B are schematics illustrating a single-stack and a multi-stack of sandwich type Li—S batteries, respectively. FIGS. 3A and 3B illustrate a method of stacking cathodes and anodes in order to efficiently utilize space available in a pouch 301. In FIG. 3A, a single-stack battery 300 is shown with a cathode 302 placed on each side of a lithium foil 304. A separator 306 is placed between the cathode 302 and the lithium foil 304 to prevent direct contact between the cathode 302 and the lithium foil 304. As arranged in FIG. 3A, a single stack Li—S battery is formed. In order to increase the energy capacity, multi-stack cells may be used. The design of a multi-stack battery 308 is demonstrated in FIG. 3B. The multi-stack battery 308 is enabled by stacking multiple batteries 300 together with additional separators 306 inserted between two adjacent batteries 300.

An embodiment is directed to a method of producing a cathode comprising: synthesizing a CNT sponge; slicing the CNT sponge into thin pieces; loading sulfur onto one of the thin CNT sponge piece; loading another CNT sponge piece on top of the one loaded with sulfur; and hot and cold pressing the sandwiched structure.

An embodiment is directed to lithiation of one of the electrodes to assemble the Si and S electrodes into a full cell. Facile lithiation of Si by making direct contact of the Si electrode with a Li metal was performed by taking advantage of the difference between electrochemical potentials of Si and Li.

The improvement in the cyclability can be attributed to the bi-functional CNT interlayer, which serve as a reservoir to capture the soluble polysulfides and a current collector by providing electron transfer paths.

In some embodiments, Li metal free LSS full cells are designed with mesoporous active materials for both lithiated Si anode and S cathode. The excellent electrochemical performances can be attributed to the alleviation of the volume change with mesoporous lithiated Si and the suppression of polysulfides shuttle with porous carbon CMK-8 and bi-functional CNT interlayers.

LSS cells have better reliability and safety over Li—S cells. The failure mechanism in Li—S battery was found to be due to dendrite formation during charge caused by excessive Li dissolution during discharge (for internal short-circuit) as well as powdery Al caused by extracting Li (discharge) out of Li—Al alloy formed during charge (for external short-circuit).

An embodiment is directed to achieving a long cycling life from Li—S batteries. This is accomplished in novel Li—S batteries with highly porous CNT sponges as the "super-reservoir" for the liquid polysulfide catholyte or solid sulfur. Embodiments of the invention are directed to novel semi-liquid Li—S batteries with high energy density, long cycling life and high C-rate capability, by using the CNT sponge as a reservoir for liquid-type active materials. In other embodiments of the invention, multidimensional structures such as carbon nanotubes, graphene and graphene flowers can be used in place of the CNT sponges for the reservoir.

WORKING EXAMPLES

Materials and Methods

Figure 4:
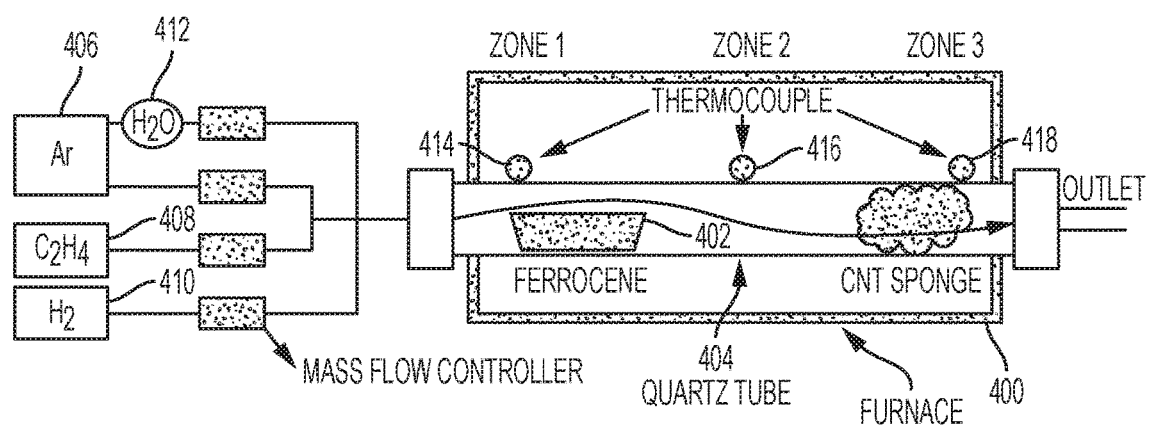
FIG. 4 is a schematic illustrating a CVD process for growing a CNT sponge.

CNT sponges were synthesized using a chemical vapor deposition (CVD) method with a temperature-programmed three-zone tube furnace. FIG. 4 is a schematic illustrating a process for synthesizing CNT sponges. As shown in FIG. 4, a furnace 400 includes an alumina crucible 402 filled with ~0.3 g of ferrocene (Sigma-Aldrich, 98%). The alumina crucible 402 was placed in zone 1 (upstream) of a quartz tube 404. In some embodiments, the quartz tube 404 has an inner diameter of ~22 mm, but may be altered based on various design parameters. Hydrogen from a supply 410 (Airgas, 99.999%), ethylene from a supply 408 (Airgas, 99.999%) and argon (Airgas, 99.999%) from a supply 406 were flowed through the quartz tube 404 at flow rates of 260 (standard cc/min) sccm, 80 sccm, and 80 sccm, respectively. The argon gas was passed through a bubbler 412 that was filled with deionized water at room temperature. The furnace temperatures of zone 1, zone 2 and zone 3 (CNT growth zone) were set to 120° C., 120° C., and 650° C., respectively. In a typical embodiment, the furnace 400 includes thermocouples 414, 416, and 418 to monitor temperatures of zones 1, 2, and 3. After the CVD reaction, the furnace was natually cooled under the argon flow.

The as-synthesized sponge was sliced into a thin layer film of less than 1 mm. Solid sulfur was placed on top of one piece of carbon nanotube sponge, followed by sandwiching with another piece of carbon nanotube sponge. The sandwiched structure was pressed with a hydraulic press machine to make a free-standing electrode. This process is illustrated in FIG. 1. In addtion to CNT sponge, some other multidimensional carbon structures were also synthesized and utilized, such as, for example a mixture of carbon nanotubes, graphene, graphene oxide, graphene flowers, and exfoliated CNT sponge. The mixture of carbon nanotubes was prepared by blending commercial single-/double-walled carbon nanotubes with commercial multi-walled carbon nanotubes. The graphene and graphene oxide used were either bought from a vendor or synthesized in the lab. The graphene flowers were prepared by two methods. One was using Mg/Zn to reduce $CO_2$ and the other one was using laser to asstist graphitization of polymers like polyimide. The exfoliation of CNT sponge was fulfilled by an electrolysis technique in an anodic environment (i.e. sulfuric acid, nitric acid, or a mixture of them). The thin films of these multi-dimensional carbon based materials were prepared by either drop-casting or vacuum filtration method followed by drying.

In some embodiments, the CNT is exfoliated to functionalize the surface and increase surface areas for the cathode, for the anode or both cathode and anode.

In order to further improve the polysulfide holding capability of these porous carbon based materials, chemical modification was applied, in which heteroatoms like nitrogen, sulfur, etc. were doped into the graphitic carbon structure by reacting the porous carbon based materials with the heteroatom containing precursors.

Figure 5:
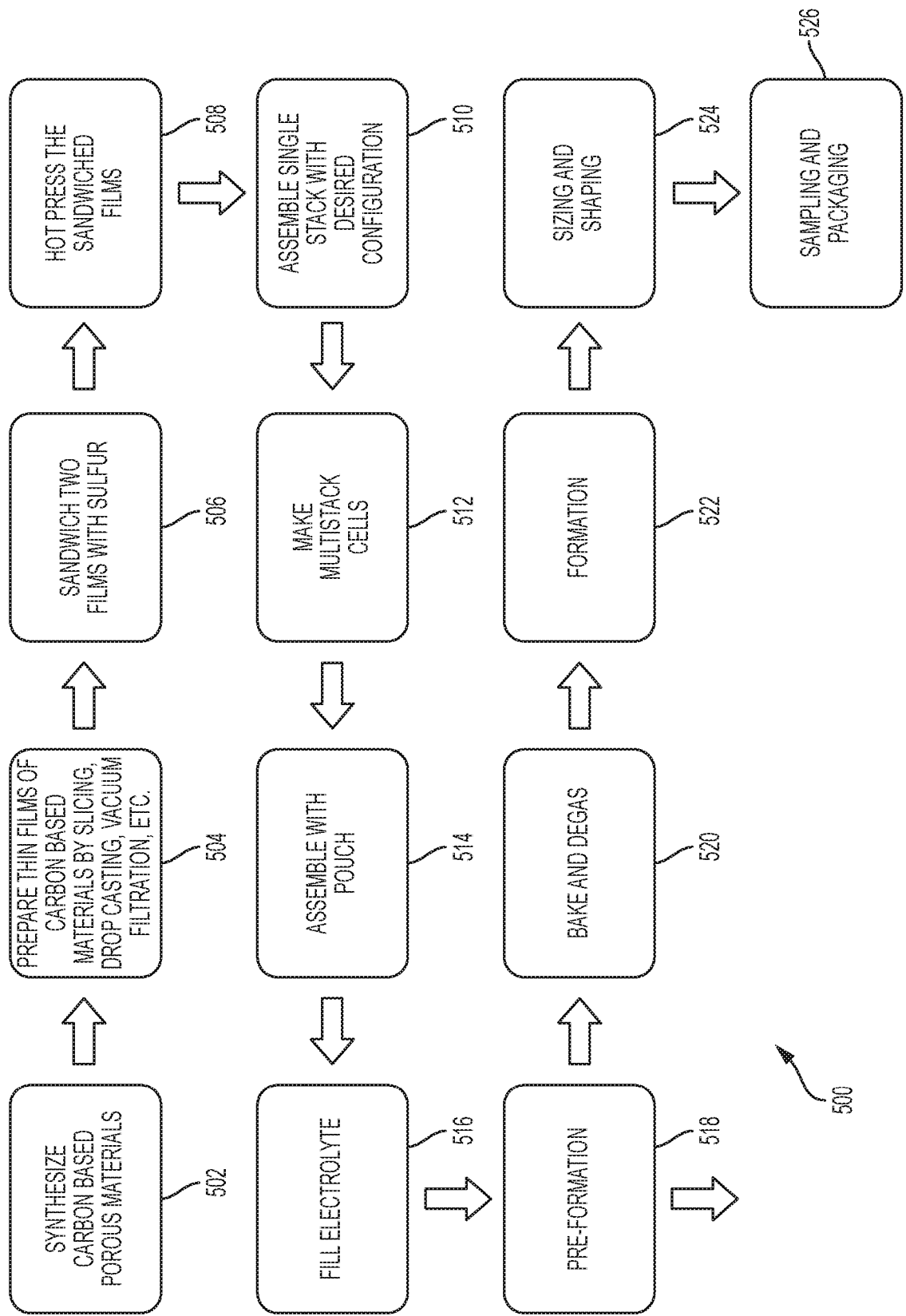
FIG. 5 is a flow diagram illustrating a method of manufacturing sandwich type Li—S batteries.

FIG. 5 is a flow diagram illustrating a method 500 of manufacturing sandwich type Li—S batteries. The method 500 is a full industry-friendly process for producing Li—S batteries with the newly designed sandwich type electrodes discussed herein. The method 500 not only simplifies the traditional method of making Li—S batteries but also reduces the cost. The method 500 is designed to match the capability and feasibility of the current production line of Li-ion batteries so that the deployment of this invention would be considerably facilitated.

The method 500 begins at step 502. At step 502, carbon-based porous materials are synthesized. The carbon-based popurous materials may be synthesized in a variety of ways, such as, for example, using the process discussed above relative to FIG. 4.

At step 504, thin films of carbon-based materials are prepared. The thin films may be prepared by slicing, drop casting, vacuum filtration, and other other processes. At step 506, a sulfur layer is sandwhiched between two thin films of the carbon-based materials. At step 508, the sandwiched materials pressed together. In a typical embodiment, the materials may be pressed together with a hydraulic press.

At step 510, a single-stack battery is assembled with a desired configuration. At step 512, a multi-stack battery may be assembled by combining single-stack batteries from step 510. At step 514, the single or multi-stack battery from step 512 is assembled into a pouch. At step 516, electrolyte is added to the pouch.

At step 518, a pre-formation process is carried out before proceeding to step 520 where baking and degasing occurs. The preformation process includes a resting step for electrolyte dispersion. At step 522, a fomation process is used to activate the electrode and to form a stable solid-electrolyte interface on the electrodes with a slow charge/discharge rate. At step 524, the battery is sized and shaped as desired. At step 526, sample products may be inspected and packaged. The method 500 described above may be modified as desired to satisfy various design parameters.

Preliminary Results with Coin Cells

Figure 6:
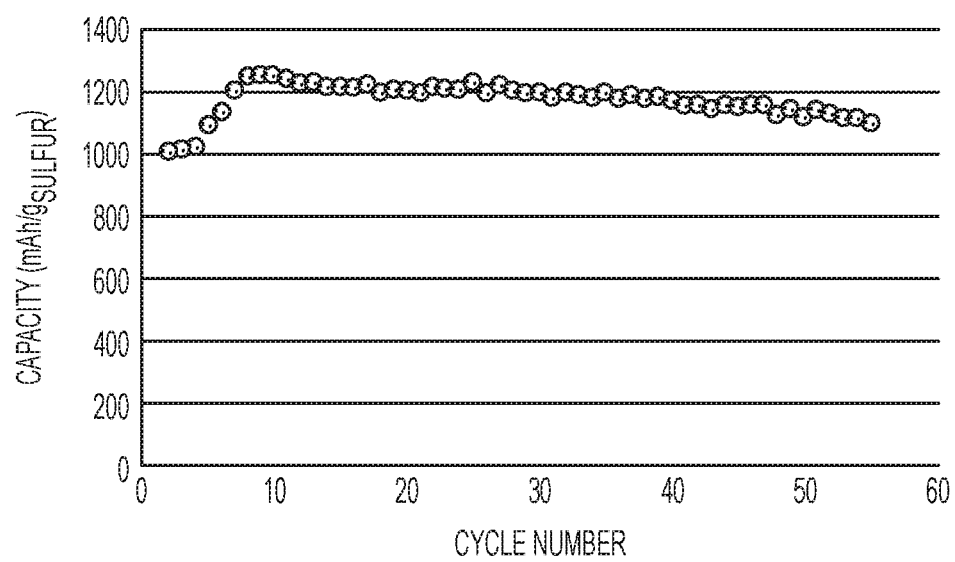
FIG. 6 is a graph of cycling performance of Li—S coin cell with sandwich type electrodes at 0.05 C charge/discharge.

A coin cell as described herein was used for a proof-of-concept test. The 2032-type coin cell was assembled with a single stack of cathode and a piece of lithium foil as anode without any current collector. A Celgard 2400 separator was used to avoid short circuit. The coin cell was tested with an Arbin BT2000 galvanostat. The capacity was reaching as high as 1262 mAh per gram of sulfur and maintaining stable for more than 60 cycles (FIG. 6) at the time of this document was prepared. The cycling number is anticipated to be up to 1000.

Preparation of Exfoliated CNT Sponges

The exfoliated CNT sponges were prepared by a mechanochemical method. First, a thin piece of CNT sponge (~1 mm thick) was cut and placed on a piece of fiberglass filtering paper in a vacuum filtering set-up. A chemical solution prepared by dissolving $KMnO_4$ in sulfuric acid was used as the exfoliating agent. The amounts of $KMnO_4$ and sulfuric acid were controlled based on the weight of CNT sponge to be treated. The weight of $KMnO_4$ in exfoliating agent is 50% of the corresponding CNT sponge and the concentration of exfoliating agent was kept at 0.5 g/mL. The exfoliating process was performed by adding the exfoliating agent dropwise on top of the CNT sponge while maintaining a vacuum filtering condition. The vacuum level was controlled to obtain different levels of exfoliation.

Preparation of Molten Li Infused CNT Sponge Anodes

The whole fabrication process was performed in a glovebox filled with argon gas. A piece of lithium metal was cut and placed on top of a stainless steel sheet that was on a hot plate with temperature controller. During the infusion process, the hot plate temperature was set at 350° C. After lithium melting, a piece of CNT sponge or exfoliated CNT sponge was put in contact with the molten lithium to start the infusion process. After infusion, the CNT sponge or exfoliated CNT sponge was fully covered with lithium.

Coin Cell Assembly and Test

CNT sponge or exfoliated CNT sponge sandwiched with sulfur was used as a cathode. An anode of pure lithium metal, lithiated silicon, molten lithium infused CNT sponge or exfoliated CNT sponge was used in certain embodiments of the invention. A piece of separator was inserted between the cathode and anode to avoid short circuit. The anode and cathode were assembled into a coin cell for testing. The battery tests were performed on a galvanostat.

Scanning electron microscope (SEM) images of pristine CNT sponge and exfoliated CNT sponge were taken. The pristine CNT sponge, the chemically treated (treated with exfoliating agent only, no vacuum) CNT sponge, and the exfoliated CNT sponge with low vacuum condition showed relatively smooth surfaces. In comparison, a clear surface exfoliation effect showed on exfoliated CNT sponge with high vacuum condition. The exfoliation very likely resulted from breaking the outer walls of multi-wall CNTs and enlarging the interplanar distance of adjacent graphitic sheets.

Transmission electron microscope (TEM) images of pristine CNT sponge and exfoliated CNT sponge were also taken. The pristine CNT sponge featured an ordered multi-wall structure. The graphitic layers were continuous throughout the area. However, the chemically treated CNT sponge demonstrated a clear difference between the inner walls and outer walls. The clear contrast difference indicated that the outer walls were more disordered and less dense than the inner walls, which can be attributed to the introduction of oxygen containing function groups (e.g. —COOH, —OH) to graphitic layer caused by exfoliating agent. On the other hand, the mechanochemical treatment created a unique trenched wall structure on the CNT sponge. This feature has not been observed in previous reports. The feature can be seen more clearly under higher magnification, which showed one typical trench on the wall of a CNT. Within the trench zone, the graphitic layers are severely exfoliated, leaving several stacks of graphene-like sheets attached on the two sides and empty space in the middle. The surface of the mechanochemically treated CNT sponge had more exfoliating features than chemically treated CNT sponge.

Figure 7:
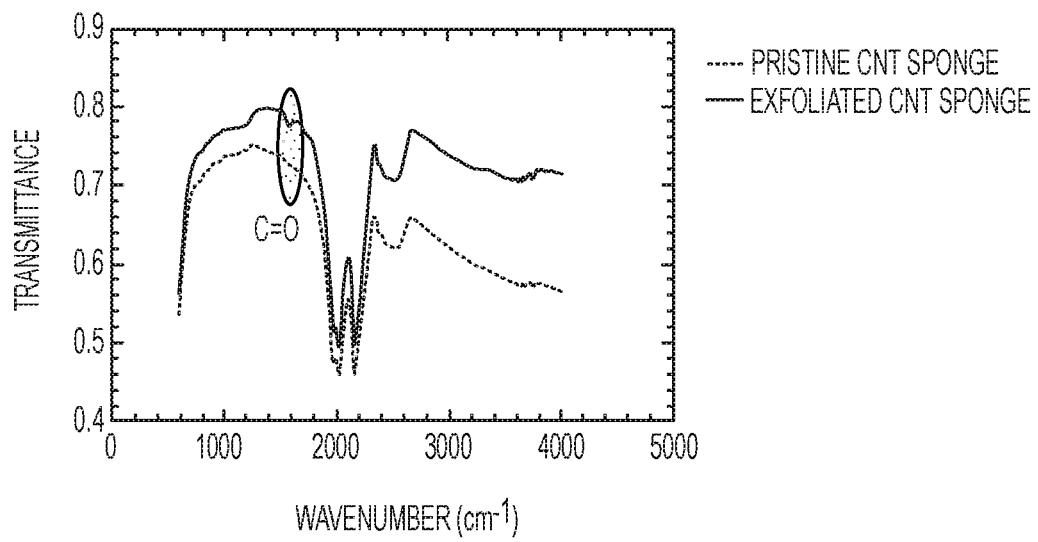
FIG. 7 is a graph of transmittance versus wavenumber for pristine CNT sponge and exfoliated CNT sponge.

Fourier transform infrared spectroscopy (FTIR) was used to reveal chemical bonding characteristics. FIG. 7 is a graph of transmittance versus wavenumber for pristine CNT sponge and exfoliated CNT sponge. A clear C=O peak appears at ~1600 $cm^{-1}$ for a sample with mechanochemical treatment, which indicated the existence of —COOH due to the strong oxidative nature of the exfoliating agent. In FIG. 7, the dashed line represents FTIR spectra of pristine CNT sponges and the solid line represents FTIR spectra of exfoliated CNT sponges.

Figure 8:
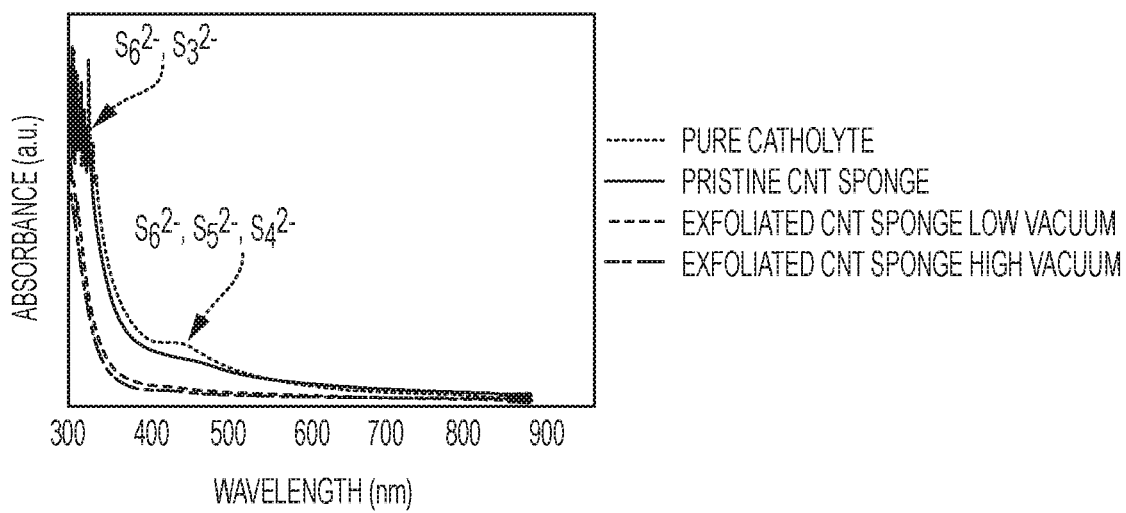
FIG. 8 is a graph of absorbance versus wavelength for pure catholyte, pristine CNT sponge, exfoliated CNT sponge in low vacuum, and exfoliated CNT sponge in high vacuum.

The exfoliated CNT sponge demonstrated improved capability of absorbing soluble polysulfides. After immersing same amount of pristine CNT sponge and exfoliated CNT sponge into catholyte, the color of the catholyte with exfoliated CNT sponge changed dramatically, indicating a large amount of polysulfides absorbed. To confirm this, the UV-Vis spectra of pure catholyte, catholyte after immersion with pristine CNT sponge, catholyte after immersion with exfoliated CNT sponge under low vacuum condition, and catholyte after immersion with exfoliated CNT sponge under high vacuum condition was taken. The absorption shown in the y-axis of FIG. 8 is related to UV-VIS spectrum absorption due to polysulfide. The absorbance was proportional to polysulfide concentrations and the absorbing wavelength depended on the kind of polysulfide. The exfoliated CNT sponges with low vacuum and high vacuum treatment conditions showed similar and high absorbing capability. The pristine CNT sponge showed little absorption, which can be explained by its polysulfide-phobic and non-exfoliated surface. Thus, the drop in the signal/peak intensity is related to the drop in polysulfide concentration caused by the polysulfide absorption on/in the exfoliated CNT sponge.

Figure 9A:
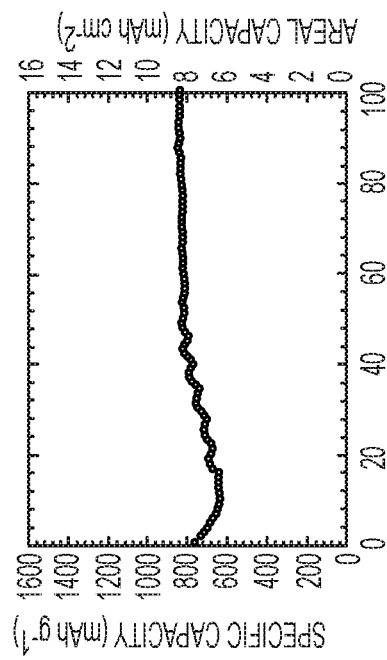
FIGS. 9A-9D are graphs of specific capacity versus cycle number for four coin cells.
Figure 9B:
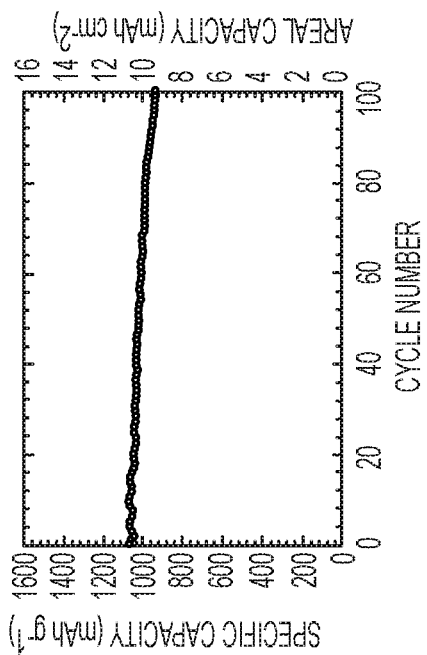
Figure 9C:
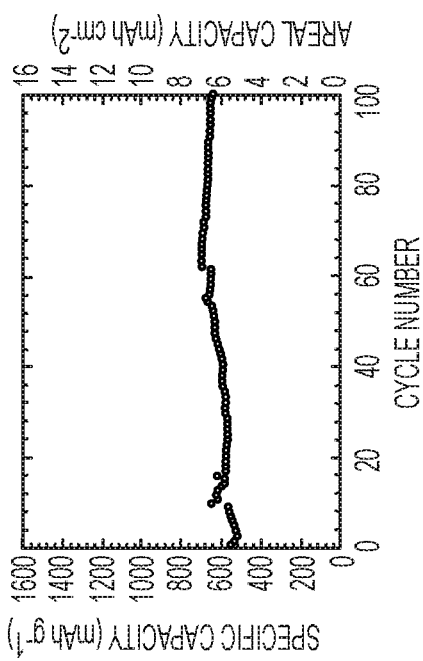
Figure 9D:
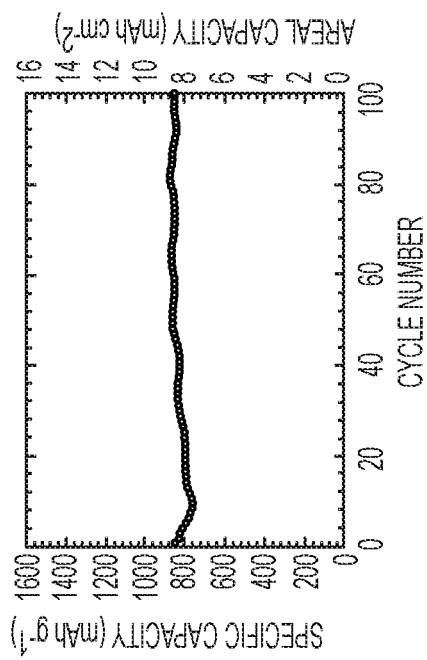

FIGS. 9A-9D show the first 100 cycles of four cells under 4.8 $mA/cm^2$ (0.3 C) charge/discharge rate. In particular, FIGS. 9A-9D are graphs of specific capacity versus cycle number for four coin cells. Each graph in FIGS. 9A-9D shows the first 100 cycles for each of the four coin cells under 4.8 mA/cm2 charge/discharge rate. Each cell had a sandwich-type cathode with 10 $mg/cm^2$ sulfur loading and lithium metal as anode. The sandwich-type cathodes were made with pristine CNT sponges (FIG. 9A), chemically treated CNT sponges (FIG. 9B), mechanochemically treated CNT sponges under low vacuum condition (FIG. 9C), and mechanochemically treated CNT sponge under high vacuum condition (FIG. 9D).

The graph in FIG. 9A with pristine CNT sponge shows gradually increased capacity and reaches its highest at the ~65th cycle. As discussed previously, the pristine CNT sponge does not have a polysulfide-philic surface, which is likely to delay the process of polysulfide dispersion within the whole sandwiched cathode. The cells with chemically treated CNT sponges (FIG. 9B) and mechanochemically treated CNT sponges under low vacuum condition (FIG. 9C) demonstrate similar performance. Their specific capacity slightly increase to ~850 mAh/g and maintain till the 100th cycle. A large performance enhancement is observed on the cell with mechanochemically treated CNT sponge under high vacuum condition (FIG. 9D). It reaches high capacity (~1080 mAh/g) at the beginning, indicating a high extent of sulfur activation/utilization. This can be ascribed to its polysulfide-philic surface and high surface area. The capacity also maintains at ~950 mAh/g at the end of 100 cycles.

Figure 10:
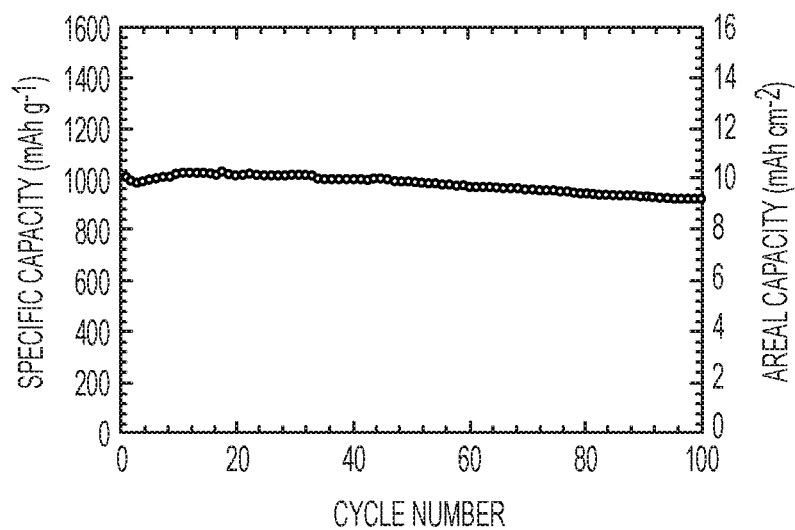
FIG. 10 is a graph of specific capacity versus cycle number for a cell with pristine CNT sponge sandwich-type cathode and molten lithium infused exfoliated CNT sponge anode.

FIG. 10 is a graph of specific capacity versus cycle number for a cell with pristine CNT sponge sandwich-type cathode and molten lithium infused exfoliated CNT sponge anode. FIG. 10 illustrates Cycling performance of a coin cell with a pristine CNT sponge sandwich-type cathode and a molten lithium infused exfoliated CNT sponge anode. Coin cell performance was improved by replacing the lithium metal anode with molten lithium infused CNT sponge. As shown in FIG. 10, the specific capacity improved substantially compared to using pure lithium anode. The benefit of using exfoliated CNT sponge at the anode side is to provide a lithium-philic host, which can facilitate the nucleation of lithium and accommodate the growth of lithium during the charging process.

While the present invention has been described in terms of certain preferred embodiments, it will be understood, of course, that the invention is not limited thereto since modifications may be made to those skilled in the art, particularly in light of the foregoing teachings.

What is claimed is:

1. A device comprising:
   a sulfur-based cathode comprising layers of sulfur sandwiched between layers of carbon nanotube film;
   an anode comprising lithium that is positioned between layers of the sulfur-based cathode, wherein the anode and the sulfur-based cathode have a mesoporous structure; and
   a reservoir that houses the sulfur-based cathode, wherein the reservoir comprises a porous carbon structure, wherein the porous carbon structure comprises liquid sulfur catholyte within its pores.

2. The device of claim 1, further comprising a separator between the sulfur-based cathode and the anode, the separator being arranged to facilitate transport of lithium ions between the anode and the cathode and to inhibit flow of other materials therebetween.

3. The device of claim 1, wherein the porous carbon structure is an electrically conducting reservoir.

4. The device of claim 1, wherein the porous carbon structure comprises carbon nanotubes.

5. The device of claim 4, wherein the carbon nanotubes comprise any of single-walled, double-walled, and multi-walled carbon nanotubes.

* * * * *